(12) United States Patent
Lents et al.

(10) Patent No.: US 6,681,592 B1
(45) Date of Patent: Jan. 27, 2004

(54) ELECTRICALLY DRIVEN AIRCRAFT CABIN VENTILATION AND ENVIRONMENTAL CONTROL SYSTEM

(75) Inventors: Charles E. Lents, Rockford, IL (US); Steven E. Squier, Rockford, IL (US); Wayne A. Thresher, Springfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 23 days.

(21) Appl. No.: 10/076,687

(22) Filed: Feb. 14, 2002

Related U.S. Application Data
(60) Provisional application No. 60/269,495, filed on Feb. 16, 2001.

(51) Int. Cl.[7] .............................. F25B 9/00; F25D 9/00
(52) U.S. Cl. .............................. 62/401; 62/402; 62/87
(58) Field of Search ........................... 62/401, 402, 87, 62/86

(56) References Cited

U.S. PATENT DOCUMENTS

| | | | | |
|---|---|---|---|---|
| 4,419,926 A | * | 12/1983 | Cronin et al. ............... | 454/74 |
| 4,869,071 A | * | 9/1989 | Wehner et al. ............... | 62/133 |
| 5,214,935 A | * | 6/1993 | Brunskill ...................... | 62/402 |
| 5,299,763 A | * | 4/1994 | Bescoby et al. ............ | 244/118.5 |
| 5,709,103 A | * | 1/1998 | Williams ....................... | 62/402 |
| 5,813,630 A | * | 9/1998 | Williams ................... | 244/118.5 |
| 5,887,445 A | * | 3/1999 | Murry et al. ................. | 62/402 |
| 5,899,085 A | * | 5/1999 | Williams ....................... | 62/236 |
| 5,911,388 A | * | 6/1999 | Severson et al. ......... | 244/118.5 |
| 5,956,960 A | * | 9/1999 | Niggeman ..................... | 62/172 |
| 5,967,461 A | * | 10/1999 | Farrington ................ | 244/118.5 |
| 6,058,715 A | * | 5/2000 | Strang et al. .................. | 62/87 |
| 6,199,387 B1 | * | 3/2001 | Sauterleute .................... | 62/87 |
| 6,257,003 B1 | * | 7/2001 | Hipsky ........................... | 62/88 |
| 6,295,822 B1 | * | 10/2001 | Mueller ........................ | 62/172 |
| 6,381,969 B1 | * | 5/2002 | Afeiche et al. ................ | 62/87 |

* cited by examiner

Primary Examiner—William C. Doerrler
(74) Attorney, Agent, or Firm—Bachman & LaPointe, P.C.

(57) ABSTRACT

The present invention relates to an electrically driven aircraft cabin and ventilation and environmental control system. The system includes at least one inlet for capturing ram air, an electrically driven compressor for pressurizing the ram air, and a thermal conditioning subsystem for thermally conditioning the pressurized ram air. The system further includes a subsystem for removing undesirable moisture from the thermally conditioned ram air.

8 Claims, 5 Drawing Sheets

ELECTRICALLY DRIVEN AIRCRAFT CABIN VENTILATION AND ENVIRONMENTAL CONTROL SYSTEM

CROSS REFERENCE TO RELATED APPLICATION(S)

This application claims the benefit of U.S. Provisional Patent Application No. 60/269,495, filed Feb. 16, 2001, entitled Electrically Driven Aircraft Cabin Ventilation and Environmental Control System.

BACKGROUND OF THE INVENTION

The present invention relates to an electrically driven aircraft cabin and ventilation and environmental control system.

Many of today's aircraft use the extraction of thrust engine compressor bleed air to power the aircraft cabin and cargo ventilation system and environmental control system (ECS). The extraction of engine cycle compressor core bleed air places a significant penalty on the engine cycle, reducing engine efficiency. Much of the power inherent in the extracted bleed air is purposely wasted in the bleed air control and distribution system to ensure that the hot bleed air conforms to aircraft material limits, before it is delivered to the ECS. In addition, the bleed air extraction and distribution equipment required to use engine bleed is expensive to purchase and install, and relatively unreliable.

Modern aircraft ventilation systems fail to use the energy contained in cabin exhaust air efficiently. Conventionally, this air is continually dumped overboard. At high altitudes, this exhaust air has useable energy based on the pressure differential with ambient and enthalpy content. At lower altitudes, where the air pressure differential is not significant, this air may be a relatively cool heat sink.

SUMMARY OF THE INVENTION

Accordingly, it is a principal object of the present invention to provide a system wherein aircraft onboard electric power is used to run the cabin pressurization and ventilation system, and the environmental control system.

The foregoing object is attained by the electrically driven aircraft cabin ventilation and environmental control system of the present invention.

In accordance with the present invention, an electrically driven aircraft cabin ventilation and environmental control system comprises means for capturing ram air, electrically driven means for pressurizing the ram air, and means for thermally conditioning the pressurized ram air. The means for thermally conditioning the pressurized ram air may utilize additional ram air and/or cabin exhaust air to carry out the thermal conditioning. The system further has a means for removing undesirable moisture from the conditioned stream.

A method for delivering conditioned air to an aircraft cabin broadly comprises the steps of capturing ram air, pressurizing at least a portion of the ram air with an electrically driven compressor, thermally conditioning the pressurized ram air, and delivering the thermally conditioned ram air to the aircraft cabin.

By employing electric power as the power source for the aircraft cabin ventilation and environmental control system rather than bleed air, the present invention contributes to the elimination of engine bleed equipment, as well as eliminating all the hot air, high pressure valves and ducting of the pneumatic distribution system from the engine bleed system to the ECS.

Other details of the electrically driven aircraft cabin ventilation and environmental control system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
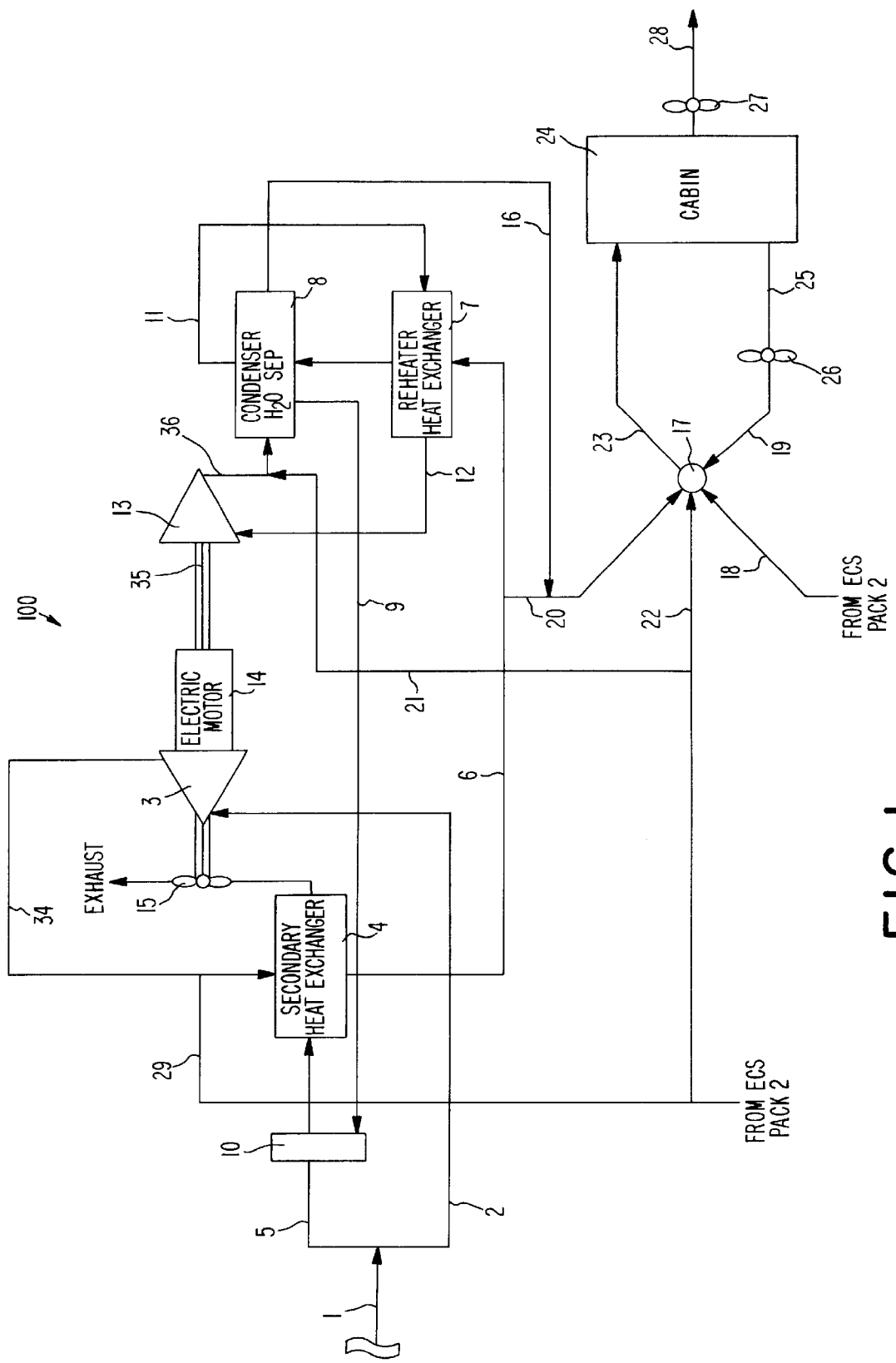
FIG. 1 is a schematic representation of a first embodiment of an electrically driven aircraft cabin ventilation and environmental control system in accordance with the present invention.

Referring now to the drawings, FIG. 1 illustrates a first embodiment of an electrically driven aircraft cabin ventilation and environmental control system 100. In this system, ram air is brought into the system 100 through ram inlet 1. The inlet 1 may be located in any suitable position on an aircraft. A portion of the ram air is diverted into conduit 2 for delivery to ventilation compressor 3 where it is compressed. The compressor 3 puts into the ram air the energy required for both cabin pressurization and pneumatically driven air conditioning, depending upon environmental and flight conditions. Some of the heat of compression is removed from the ventilation compressor exit stream 34 in a secondary heat exchanger 4. The heat sink for the heat exchanger 4 is ram air obtained from the ram inlet 1 that is not delivered to the compressor 3 and is instead diverted into the conduit 5. On the ground, a ram air fan 15, connected to the ECS turbomachine shaft 35, provides the energy necessary to draw air through the system. The heat sink ram air delivered to the heat exchanger 4 is precooled by the injection and evaporation of liquid water in the spray cooler 10. A portion of the hot compressed ventilation air stream is removed upstream of the heat exchanger 4 through line 29 to provide temperature modulation in the air cycle subsystem and air distribution system.

The cooled pressurized air is delivered to a conventional high pressure water separator air cycle subsystem via line 6. The air is additionally cooled in a reheater heat exchanger 7 and then further cooled in a condenser heat exchanger 8, where water vapor contained in the air is condensed to liquid and separated from the cold air through stream 9. This stream of liquid water is delivered to the spray cooler 10, where it is injected into the incoming ram air stream to precool the heat sink for the secondary heat exchanger 4. The cold dry pressurized air leaving the condenser 8 is delivered to the opposite side of the reheater 7 through line 11 where it is warmed in the reheater 7 as it cools the incoming air stream from the secondary heat exchanger 4. The warm, dry air is delivered through line 12 to the inlet of cooling turbine 13. Expansion of the cool pressurized dry air across the cooling turbine 13 reduces the pressure and temperature of the air. To control and moderate the outlet temperature of the cooling turbine air, hot bypass air 21 from another ECS pack aboard the aircraft is mixed downstream of the exit 36 of the turbine 13. Work done by expansion in the cooling turbine 13 is used along with primary power supplied by an electric motor 14 to drive the ventilator compressor 3 and ram air fan 15, which are on the same shaft as the electric motor 14 and the cooling turbine 13.

Cool dry air exiting from the condenser 8 is delivered B through line 16 to the cabin air distribution system mix manifold 17. In the mix manifold 17, the cooled dry air is combined with similar cool conditioned air from other operating air cycle system packs via line 18, and with cabin recirculated air via line 19. During conditions when operation of the air cycle cooling system is not required to provide cold air, the pressurized air stream 6 from the secondary heat exchanger 4 is bypassed through line 20 directly to the mix manifold 17. The air in the mix manifold 17 is further conditioned by the addition of hot bypass air 22 as necessary to provide the desired cabin supply air temperature. The conditioned cabin supply air is then delivered through line 23 to the cabin 24. A portion of the cabin exhaust air 25 is recirculated back to the mix manifold 17 with motion flow power provided by the recirculating fan 26. The remainder of the cabin exhaust air is exhausted to ambient through exhaust fan 27 and overboard line 28.

Figure 2:
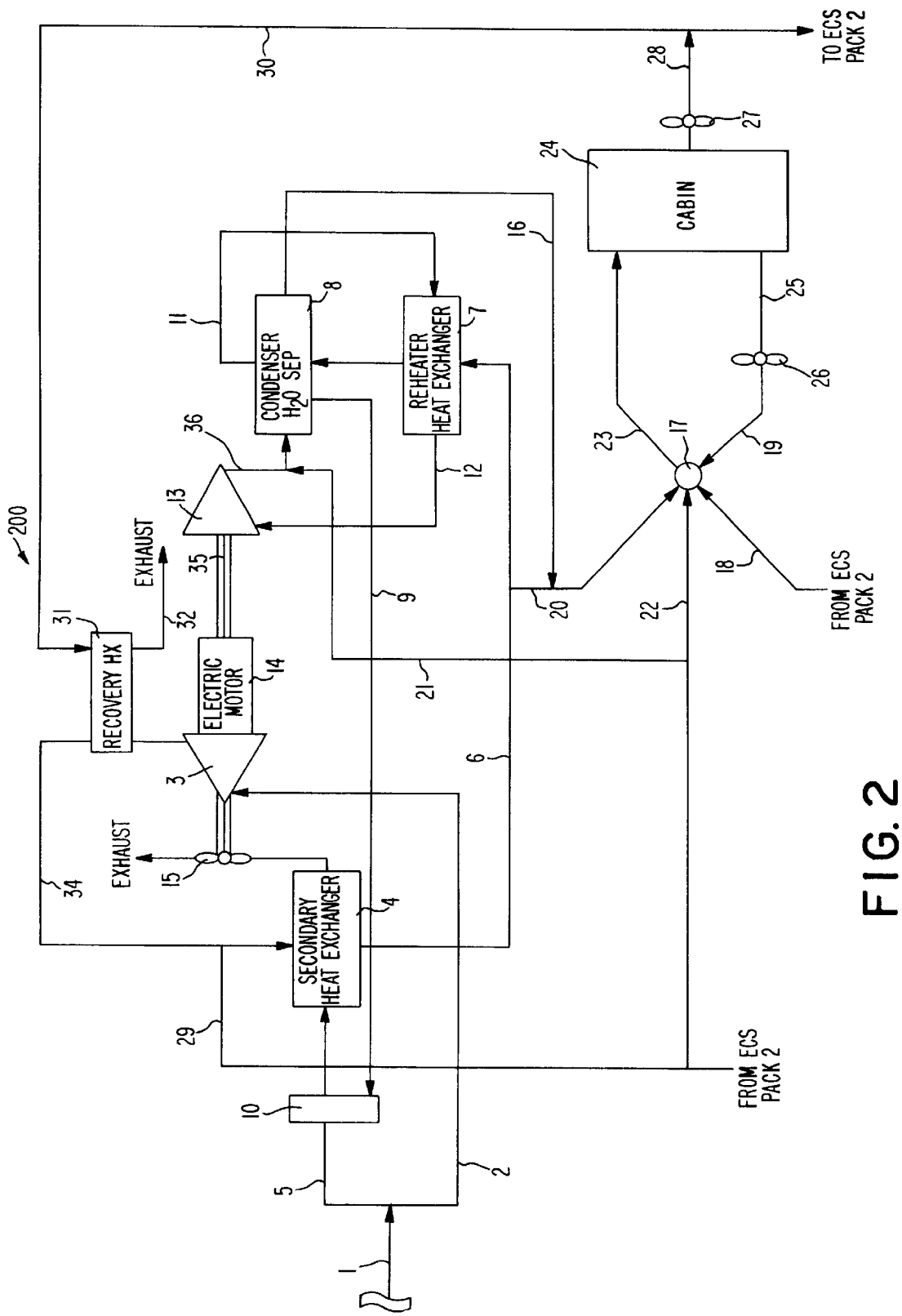
FIG. 2 is a schematic representation of a second embodiment of an electrically driven aircraft cabin ventilation and environmental control system in accordance with the present invention.

Referring now to FIG. 2, a second embodiment of an electrically driven aircraft cabin ventilation and environmental control system 200 is illustrated. As can be seen from this figure, system 200 retains the architecture of the system 100. In this embodiment however, instead of exhausting the non-recirculated cabin air flow overboard, this air is delivered through line 30 to recovery heat exchanger 31, where the cooler cabin air provides a heat sink for the hot ventilation compressor exit air, effectively precooling it prior to its delivery to the secondary heat exchanger 4. The cabin air is then exhausted overboard through line 32. The use of this cool cabin air offloads the cooling load of the secondary heat exchanger 4, and therefore reduces the amount of ram air required, and its extraction penalty, to precool the air cycle system delivery air. This potentially results in a decrease in total heat exchanger weight and aircraft drag.

Figure 3:
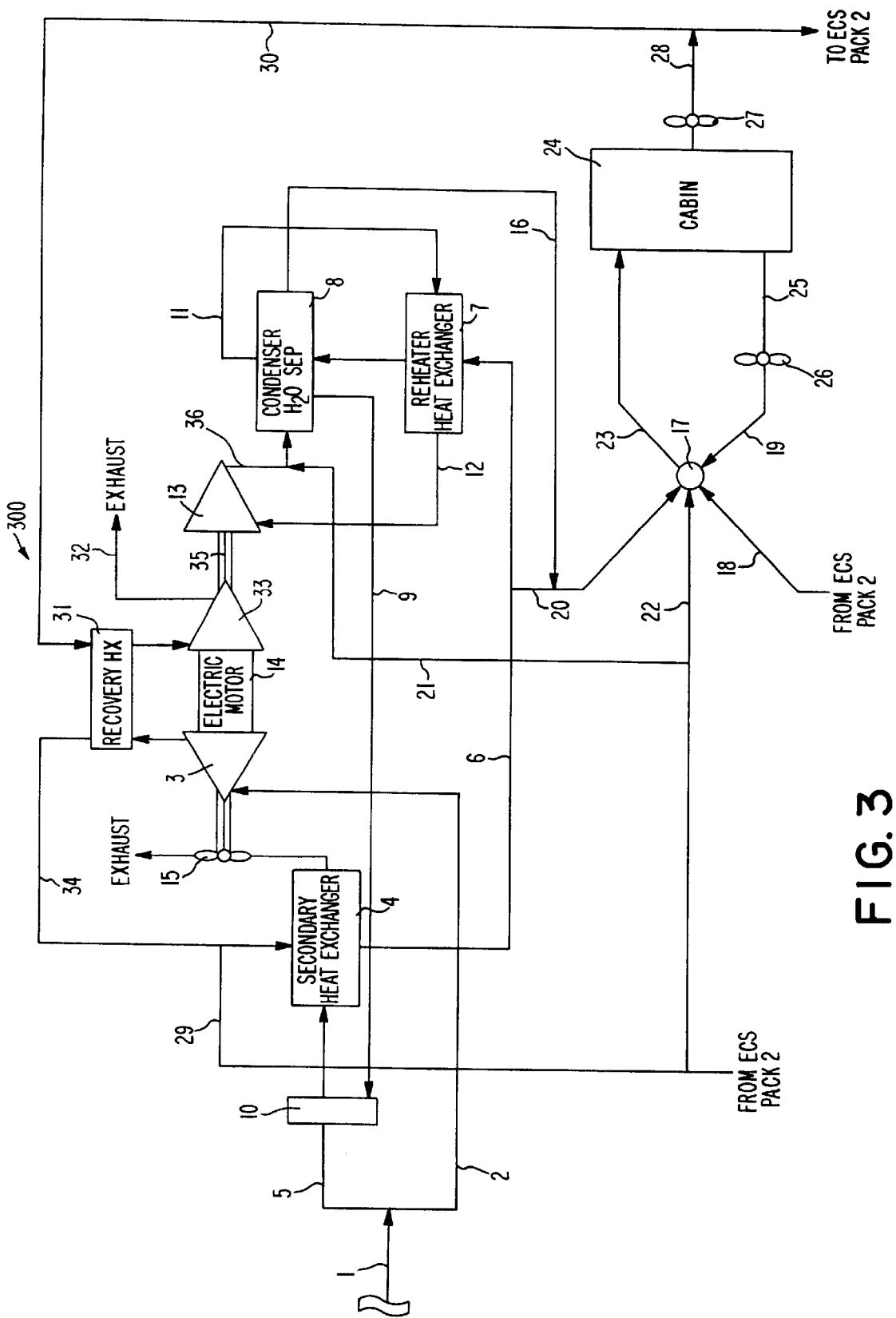
FIG. 3 is a schematic representation of a third embodiment of an electrically driven aircraft cabin ventilation and environmental control system in accordance with the present invention.

FIG. 3 illustrates a third embodiment of an electrically driven aircraft cabin ventilation and environmental control system 300 in accordance with the present invention. This embodiment employs the basic architecture of the system 100 and the modifications of system 200. In this system however, after the cabin exhaust air has been used as a heat sink for the ventilation compressor exit air, the cabin air stream is expanded across a power turbine 33. This is done to extract additional energy from the stream as a result of the differential between the cabin pressure and the ambient pressure and the enthalpy content of the stream. Power turbine 33 is preferably attached to the same shaft as the ventilation compressor 3 and the cooling turbine 13, and its work is delivered to the compressor 3 as shaft power to offset the electrical power required at the motor 14.

A variation of the system of FIG. 3 involves using a single turbine instead of two, essentially integrating the functions of both the cooling turbine 13 and the power turbine 33. This single turbine would perform the cooling turbine function for most of the flight, but at altitude, where the cooling turbine function is not necessary, it would be used for energy recovery of cabin exhaust air. Only one of these functions would be performed under any given conditions, with the cooling function having priority over the energy recovery function. Thereby, through appropriate mode switching based on current environmental conditions, the single turbine could perform either function as desired.

Figure 4:
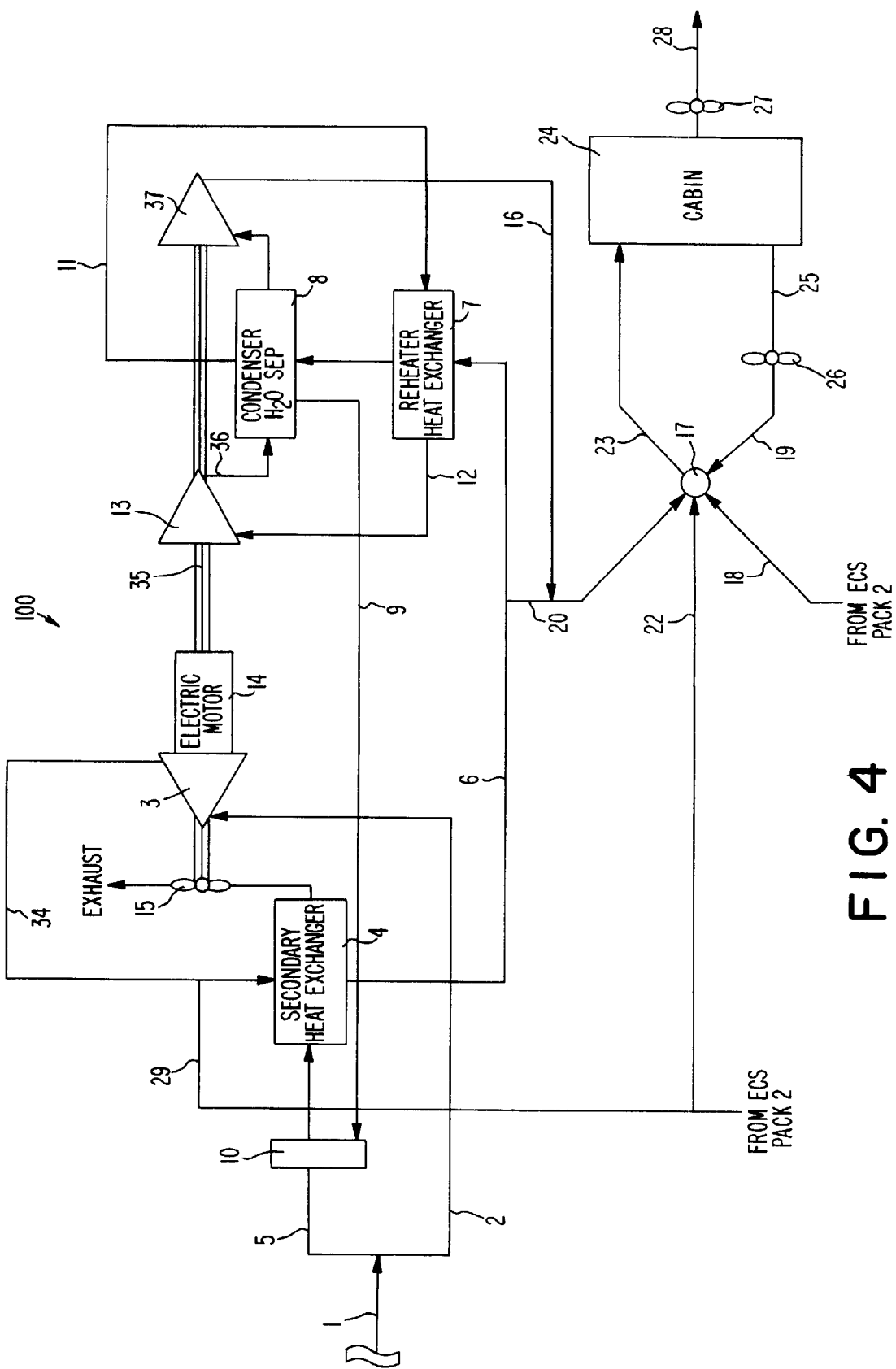
FIG. 4 is a schematic representation of a fourth embodiment of an electrically driven aircraft cabin ventilation and environmental control system in accordance with the present invention.

FIG. 4 illustrates yet another embodiment of an electrically driven aircraft cabin ventilation and environmental control system in accordance with the present invention. In this embodiment, the single cooling turbine/high pressure water separator based air cycle subsystem loop is replaced with a condensing air cycle subsystem. In this embodiment, the cool dehumidified air leaving the condenser 8 at intermediate pressure enters the condensing turbine 37, where through further expansion the air is cooled and exits close to the desired cabin pressure level. This embodiment eliminates the need for hot air bypass tempering of the stream exiting the cooling turbine 13, as the conditions exiting the cooling turbine 13 are moderated by the controlled partial expansion of the air stream to give the desired temperature at the inlet of the condenser 8.

Figure 5:
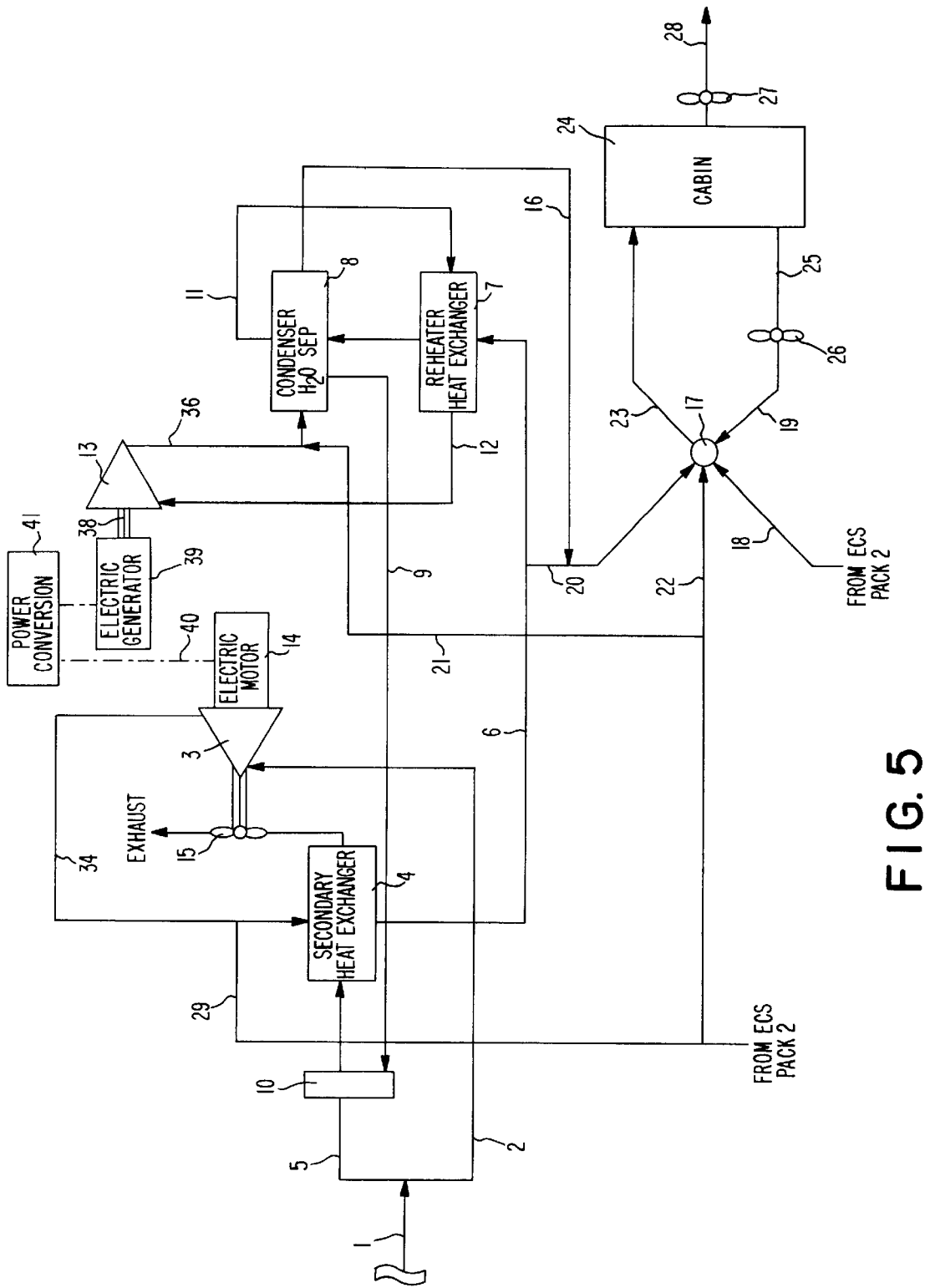
FIG. 5 is a schematic representation of a fifth embodiment of an electrically driven aircraft cabin ventilation and environmental control system in accordance with the present invention.

FIG. 5 illustrates yet another embodiment of an electrically driven aircraft cabin ventilation and environmental control system in accordance with the present invention. In this embodiment, the ventilation compressor 3 and the air cycle subsystem are located on two independent shafts. One shaft would carry the ventilation compressor 3, the electric motor 14, and optionally the power turbine (not shown). Another shaft 38 would carry the cooling turbine 13, an electric generator 39, and a condensing turbine (not shown) if a condensing cycle is used. Energy flow (power) between the two subsystems would then be transmitted by an electric link 40 through power conversion hardware 41 associated with the motor 14 and generator 39. The primary power for the ventilation system compression and the ram air fan 15 is delivered by the electric motor 14. This power is supplemented by the shaft power developed in the cooling turbine 13, and if appropriate, the shaft power developed by the power turbine 33 and/or the condensing turbine. The electric ECS turbomachine incorporates the cooling turbine and/or power turbine, the electric motor, and/or generator, ventilation compressor and ram fan onto a single shaft, or onto two shafts. The motor and/or generator must operate at variable speed, therefore an inverter/motor drive and associated control functions will be required for each.

It is apparent that there has been provided an electrically driven aircraft cabin ventilation and environmental control system which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. An electrically driven aircraft cabin ventilation and environmental control system comprising:
   means for capturing ram air;
   means for creating a first flow of said ram air and a second flow of said ram air;
   electrically driven means for receiving said first flow of ram air and for creating a pressurized ram air flow;
   first means for cooling said pressurized ram air flow, said first cooling means receiving said second ram air flow and using said second ram air flow as a heat sink;

second means for receiving said cooled pressurized ram air from said first cooling means and for cooling and removing moisture from said cooled pressurized ram air;

expansion means for receiving said cooled ram air from said second means and for expanding said cooled ram air;

means for delivering said cooled pressurized air from said expansion means to said cabin;

said delivering means comprises a mix manifold for receiving an exit air stream from said expansion means and for delivering air to said cabin;

said mix manifold receives at least one of recirculated air from said cabin, a portion of said pressurized ram air prior to said compressed air entering said first cooling means, and hot gas bypass air from an engine;

a recovery heat exchanger for receiving said air exiting said, electrically driven means;

means for delivering cabin exhaust air to said recovery heat exchanger to act as a heat sink; and said electrically driven means, an electric motor for driving said electrically driven means, and a power turbine mounted on a common shaft and said cabin exhaust air delivered to said recovery heat exchanger further being used to drive said power turbine.

2. An electrically driven aircraft cabin ventilation and environmental control system comprising:

means for capturing ram air;

means for creating a first flow of said ram air and a second flow of said ram air;

electrically driven means for receiving said first flow of ram air and for creating a pressurized ram air flow;

first means for cooling said pressurized ram air flow, said first cooling means receiving said second ram air flow and using said second ram air flow as a heat sink;

second means for receiving said cooled pressurized ram air from said first cooling means and for cooling and removing moisture from said cooled pressurized ram air;

expansion means for receiving said cooled ram air from said second means and for expanding said cooled ram air;

means for delivering said cooled pressurized air from said expansion means to said cabin; and means for mixing hot bypass air from another ECS pack with air exiting said expansion means prior to said air being delivered to said second cooling means.

3. A method for delivering conditioned air to an aircraft cabin comprising the steps of:

capturing ram air;

creating a first flow of ram air and a second flow of ram air from said captured ram air;

delivering said first flow of ram air to an electrically driven compressor and pressurizing said ram air in said compressor;

providing first means for cooling said pressurized ram air;

delivering said second ram air flow to said first cooling means and using said second ram air flow as a heat sink;

providing second means for cooling said ram air and for removing moisture from said ram air;

delivering said cooled ram air from said first cooling means to said second cooling means;

providing expansion means and delivering said cooled ram air from said second cooling and moisture removing means to an inlet of said expansion means;

delivering said cooled pressurized air from an outlet of said expansion means to said cabin;

said second cooling and moisture removing means providing step comprising providing a reheater heat exchanger and a condenser;

said step of delivering said cooled ram air from said first cooling means comprising cooling said ram air by passing said ram air through said reheater heat exchanger and said condenser;

warming said air exiting said condenser by passing said air through said reheater heat exchanger;

said expansion means comprising a cooling turbine;

introducing said warmed air exiting said reheater heat exchanger into an inlet of said cooling turbine;

expanding said air introduced into said cooling turbine inlet;

said delivering step comprising introducing said expanded air exiting said cooling turbine into said condenser and delivering said expanded air in a cooled condition to a cabin air distribution system mix manifold; and mixing hot gas bypass air from an engine with said expanded air prior to introducing said expanded air into said condenser.

4. A method according to claim 3, wherein said delivering step further comprises introducing at least one of recirculated cabin air, hot gas bypass air, and a portion of said air exiting said secondary heat exchanger into said mix manifold.

5. A method according to claim 4, further comprising exhausting a portion of said cabin air overboard the aircraft.

6. A method according to claim 4, further comprising providing a recovery heat exchanger, introducing pressurized air exiting said compressor into said recovery heat exchanger, and providing a cabin air portion to said recovery heat exchanger for use as a heat sink.

7. A method according to claim 6, further comprising exhausting said cabin air portion to the ambient after its use as a heat sink.

8. A method according to claim 6, further comprising providing a power turbine to drive said compressor, introducing said cabin air portion in a heated condition into an inlet of said power turbine to drive a shaft one on which said power turbine and said compressor are mounted, and exhausting an exit stream from said power turbine to the ambient atmosphere.

* * * * *